UNITED STATES PATENT OFFICE.

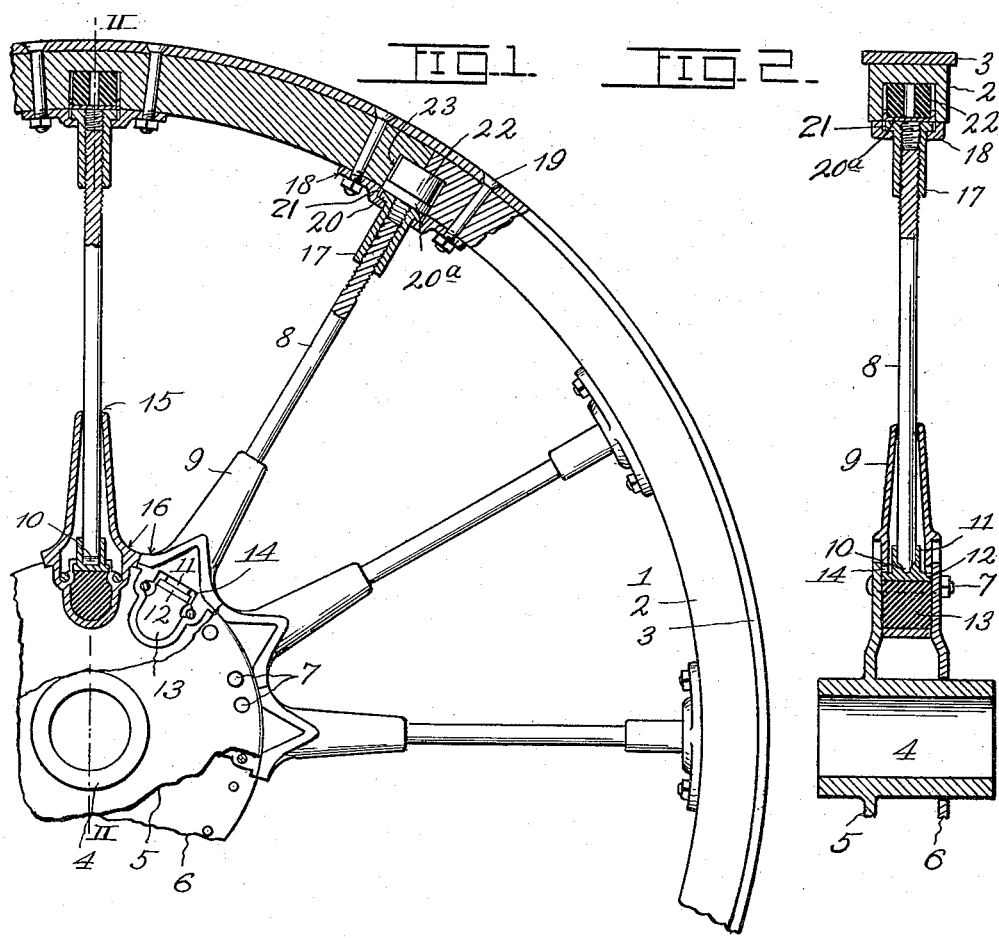

WILLIS W. KRUTSCH, OF COFFEYVILLE, KANSAS, ASSIGNOR OF ONE-HALF TO CHARLIE ALLEN WALKER, OF COFFEYVILLE, KANSAS.

RESILIENT WHEEL.

1,162,078.  Specification of Letters Patent.  Patented Nov. 30, 1915.

Application filed March 1, 1915. Serial No. 11,429.

*To all whom it may concern:*

Be it known that I, WILLIS W. KRUTSCH, a citizen of the United States, residing at Coffeyville, in the county of Montgomery and State of Kansas, have invented certain new and useful Improvements in Resilient Wheels, of which the following is a specification.

My invention relates to improvements in resilient wheels, and the present invention relates more particularly to the wheel spokes, and certain adjacent parts whereby the rims of the wheels are permitted to pass over obstructions without materially raising the wheel hubs therewith and imparting undue shock to the vehicle body.

In order that the invention may be fully understood, reference will now be made to the accompanying drawing, in which:

Figure 1 is a broken side elevation partly in section of a wheel embodying the invention. Fig. 2 is a section on line II—II of Fig. 1. Fig. 3 is a detail perspective of a saddle employed in carrying out the invention. Fig. 4 is a broken detail perspective of the inner end of one of the spoke members.

1 designates the rim of the wheel which consists of the usual fellies 2 and tire 3.

4 designates the wheel hub which has an integral peripheral flange 5 and a removable peripheral flange 6, which latter is spaced from the former but connected thereto by bolts 7.

8 designates a male spoke member and 9 an outwardly tapered female spoke member into which the inner end of the male spoke member 8 extends and is free to move to a limited extent.

The inner end of the male spoke member 8 terminates in a reduced flat portion 10, that snugly fits within a corresponding seat in a saddle 11. The saddle 11 has a rectangular base 12 which rests upon a cushion 13 in the hub end of the female spoke member 9, said hub end being secured between the flanges 5 and 6 of the hub by the bolts 7. Two sides of the hub end of the female spoke member 9 have slots 14 to permit the two adjacent sides of the saddle base 12 to abut the hub flanges 5 and 6 and prevent lateral movement of the saddle 11, so that the wheel cannot dish or collapse. The slots 14, however, are of sufficient length, as disclosed by Fig. 1, to permit slight movement of the saddle 11 longitudinally of said slots, so that the male spoke member 8 may rock to a limited extent on the reduced end 15 of the female spoke member. The female spoke members 9 are held from lateral movement in one direction by the hub flanges 5 and 6, and from lateral movement in another direction by abutting shoulders 16, integral with said female spoke members. By thus rigidly securing the hub ends of the female spoke members 9, considerable stability is added to the whole.

The rim ends of the male spoke members 8 are threaded into sleeves 17, rotatably mounted in clips 18, secured to the rim 1 by bolts 19. The rim end of the sleeves 17 have marginal flanges 20, which fit in corresponding sockets 21 in the clips 18. The flanges 20 bear against caps $20^a$, which in turn abut resilient cushions 22, arranged in cavities 23 in the fellies 2.

In practice when the rim of the wheel passes over an obstruction in the roadway, the spokes below the hub 4 contract, while those above the hub lengthen out, and thus permit the rim to move up more or less independently of the hub. Thus it will be understood that the vehicle will be relieved to a large extent of shock incident to its wheels passing over obstructions.

When the wheel rim moves over an obstruction, as above referred to, the male spoke members 8, which happen to occupy horizontal or near horizontal positions, rock upward on the points 15 of the female spoke members 9, and consequently will be free to move longitudinally to a limited extent without binding in said female spoke members 9.

Should any of the spokes become loose they can be readily tightened by rotating the sleeves 17 in the proper direction, the male spoke members 8 being prevented from rotating therewith by their transverse hub ends 10 and the saddles 11. The cushions 22 are protected from abrasion or wear when the sleeves 17 are rotated, by the intervening caps $20^a$.

While I have shown and described the preferred form of my invention, I reserve the right to make such changes in the construction, combination and arrangement of parts as properly fall within the spirit and scope of the claims.

Having thus described my invention, what

I claim and desire to secure by Letters Patent, is:

1. In combination, a vehicle wheel rim, a hub, male spoke members interposed between said rim and the hub, sleeves threaded upon the rim ends of the male spoke members to adjust the same longitudinally, cushions interposed between said sleeves and the rim, female spoke members secured to the hub and in which the male spoke members have limited movement, and means in said female spoke members engaging the hub ends of the male spoke members to prevent the same from rotating.

2. In combination, a vehicle wheel rim, a hub, male spoke members interposed between said rim and the hub, sleeves threaded upon the rim ends of the male spoke members to adjust the same longitudinally, female spoke members secured to the hub and in which the male spoke members have limited movement, saddles having limited movement in the female spoke members and engaging the hub ends of the male spoke members to prevent the same from rotating with the sleeves, and cushions interposed between said saddles and the hub ends of the female spoke members.

In testimony whereof I affix my signature, in the presence of two witnesses.

WILLIS W. KRUTSCH.

Witnesses:
F. G. FISCHER,
L. J. FISCHER.

Copies of this patent may be obtained for five cents each, by addressing the "Commissioner of Patents, Washington, D. C."